US006536468B1

(12) United States Patent
Wilmer et al.

(10) Patent No.: US 6,536,468 B1
(45) Date of Patent: Mar. 25, 2003

(54) WHIRLPOOL REDUCTION CAP

(75) Inventors: Jeffrey A. Wilmer, Mesa, AZ (US); David R. Kuyat, Chandler, AZ (US)

(73) Assignee: Kinetics Chempure Systems, Inc., Tempe, AZ (US)

( * ) Notice: Subject to any disclaimer, the term of this patent is extended or adjusted under 35 U.S.C. 154(b) by 0 days.

(21) Appl. No.: 09/635,288

(22) Filed: Aug. 9, 2000

Related U.S. Application Data

(63) Continuation-in-part of application No. 08/934,819, filed on Sep. 22, 1997, now Pat. No. 6,109,778.

(51) Int. Cl.[7] ................................ F16K 37/00

(52) U.S. Cl. .................. 137/544; 137/549; 137/565.37; 137/590; 137/811; 137/812; 366/137

(58) Field of Search .......................... 366/165.2, 165.5, 366/137; 137/590, 810, 811, 812, 563, 565.37, 549, 544

(56) References Cited

U.S. PATENT DOCUMENTS

| | | | | |
|---|---|---|---|---|
| 118,548 | A | 8/1871 | Oliver | |
| 626,950 | A | 6/1899 | Wheelwright | |
| 687,132 | A | 11/1901 | Deming | |
| 913,742 | A | 3/1909 | Lewis | |
| 975,380 | A | 11/1910 | Berntson | |
| 1,032,663 | A | 7/1912 | Fay | |
| 1,156,946 | A | 10/1915 | Vandercook | |
| 1,160,848 | A | 11/1915 | Conklin | |
| 1,192,478 | A | 7/1916 | Vandercook | |
| 1,382,992 | A | 6/1921 | Lombard | |
| 1,580,476 | A | 4/1926 | Fassio | |
| 1,596,893 | A | 8/1926 | Schifter | |
| 1,918,509 | A | 7/1933 | Wilcox | |
| 1,992,261 | A | 2/1935 | Traudt | 259/95 |
| 1,996,279 | A | 4/1935 | Dillon | 4/292 |
| 2,107,390 | A | 2/1938 | Rosmait | 92/37 |
| 2,135,261 | A | 11/1938 | Rosmait | 92/37 |
| 2,522,300 | A | 9/1950 | Richard | 95/97 |
| 2,528,094 | A | 10/1950 | Walker | 259/4 |
| 2,528,514 | A | 11/1950 | Harvey et al. | 71/41 |
| 2,582,198 | A | 1/1952 | Etheridge | 127/28 |
| 2,590,431 | A | 3/1952 | Rose | 210/16 |
| 2,603,460 | A | 7/1952 | Kalinske | 259/4 |
| 2,906,607 | A | 9/1959 | Jamison | 23/271 |
| 2,997,373 | A | 8/1961 | Stephens | 23/272.6 |
| 3,024,914 | A | 3/1962 | Robson | |
| 3,871,272 | A | 3/1975 | Melandri | 99/276 |
| 4,164,541 | A | 8/1979 | Platz et al. | |
| 4,394,966 | A | 7/1983 | Snyder et al. | |
| 4,534,655 | A | 8/1985 | King et al. | 366/137 |
| 4,542,775 | A * | 9/1985 | Beck | 137/812 |
| 4,875,781 | A | 10/1989 | Raska | 366/130 |
| 5,609,417 | A | 3/1997 | Otte | 366/137 |
| 5,724,684 | A | 3/1998 | Paar | 4/288 |
| 5,765,945 | A | 6/1998 | Palmer | 366/167.1 |
| 5,769,536 | A | 6/1998 | Kotylak | 366/136 |
| 5,799,339 | A | 9/1998 | Perry et al. | 4/286 |
| 6,014,987 | A | 1/2000 | List et al. | |
| 6,164,332 | A * | 12/2000 | Hatton | 137/812 |

FOREIGN PATENT DOCUMENTS

| | | |
|---|---|---|
| WO | WO 95/03120 | 2/1995 |
| WO | WO 99/15265 A2 | 4/1999 |

OTHER PUBLICATIONS

International Search Report issued Mar. 26, 2002 from International Patent Application PCT/US 01/24953, filed Aug. 9, 2001.

* cited by examiner

*Primary Examiner*—A. Michael Chambers
(74) *Attorney, Agent, or Firm*—Wolf, Greenfield, & Sacks, P.C.

(57) ABSTRACT

A whirlpool reduction cap. The cap for redirecting fluid flow towards an exit port or drain in a vessel comprises a top solid surface area greater than or equal to the area of the exit port, a base connected to the exit port, a side wall positioned between the top surface and the exit port, and an inlet positioned in the side wall, thereby reducing formation of a vortex as a fluid is drained from the vessel.

36 Claims, 4 Drawing Sheets

WHIRLPOOL REDUCTION CAP

This application is a continuation-in-part of U.S. application Ser. No. 08/934,819, filed Sep. 22, 1997, now U.S. Pat. No. 6,109,778.

FIELD OF THE INVENTION

The present invention relates, in general, to mixing and holding vessels and, more particularly, to an apparatus that redirects fluid flow through an exit port of a vessel for reducing or eliminating vortex formation as a fluid is drained from the vessel.

BACKGROUND OF THE INVENTION

Various means for mixing fluids are known in the art. Both intrusive and non-intrusive means have been used to mix fluids, including colloidal suspensions, to prevent separation of homogeneous solutions into constituent components and/or to reconstitute solutions that have separated into constituent elements. Intrusive mixing devices, or those objects and devices which are inserted into a fluid to agitate the fluid with the assistance of an external power source, are well known. Such devices involve the use of intrusive mechanical mixers powered by electric or pneumatic motors. These devices provide relatively high torque and/or rotation of the fluid and may result in adverse effects on the fluid as a result of the formation of a significant vortex or whirlpool in the fluid. Moreover, when a fluid is drained from a holding vessel through a drain in a vertical direction, typically, pockets of little or no fluid movement may be created at the base of the holding vessel.

In some chemical environments, further adverse effects of intrusive agitation can be seen in the form of foaming or gelling of the body of fluid while it is being mixed in a mixing tank or similar holding vessel. Such foaming or gelling may change the parameters of fluids' various chemical compositions and adversely affect their performance. Additionally, intrusive mixing devices and methods may introduce air into the mixture or fluid and may cause oxidation of certain chemical mixtures thereby changing the chemical reactivity of the fluid.

Fluids, and in particular, colloidal suspensions such as slurries used in Chemical Mechanical Planarization (CMP) of semiconductor wafers are most effective when delivered to CMP tools in a homogenous state with no air in the supply line delivering fluid to these tools.

SUMMARY OF THE INVENTION

In one embodiment the invention provides a whirlpool reduction cap comprising a top solid surface greater than or equal to the area of an exit port in a vessel, a base connected to the exit port, a side wall positioned between the top surface and the base. An inlet is positioned in the side wall which may comprise one or more orifices.

The invention has particular applicability for mixing and delivery of colloidal suspensions, including slurries used in CMP of semiconductor wafers. Such colloidal suspensions are notorious for separating from homogeneous distribution into constituent chemical components. More generally, however, the invention may be used in numerous other applications requiring homogeneous fluids, and it is not contemplated that the invention would be limited to slurry or CMP applications.

BRIEF DESCRIPTION OF THE DRAWINGS

Preferred non limiting embodiments of the present invention will be described by way of example with reference to the accompanying drawings, in which.

DETAILED DESCRIPTION OF THE INVENTION

Figure 1:
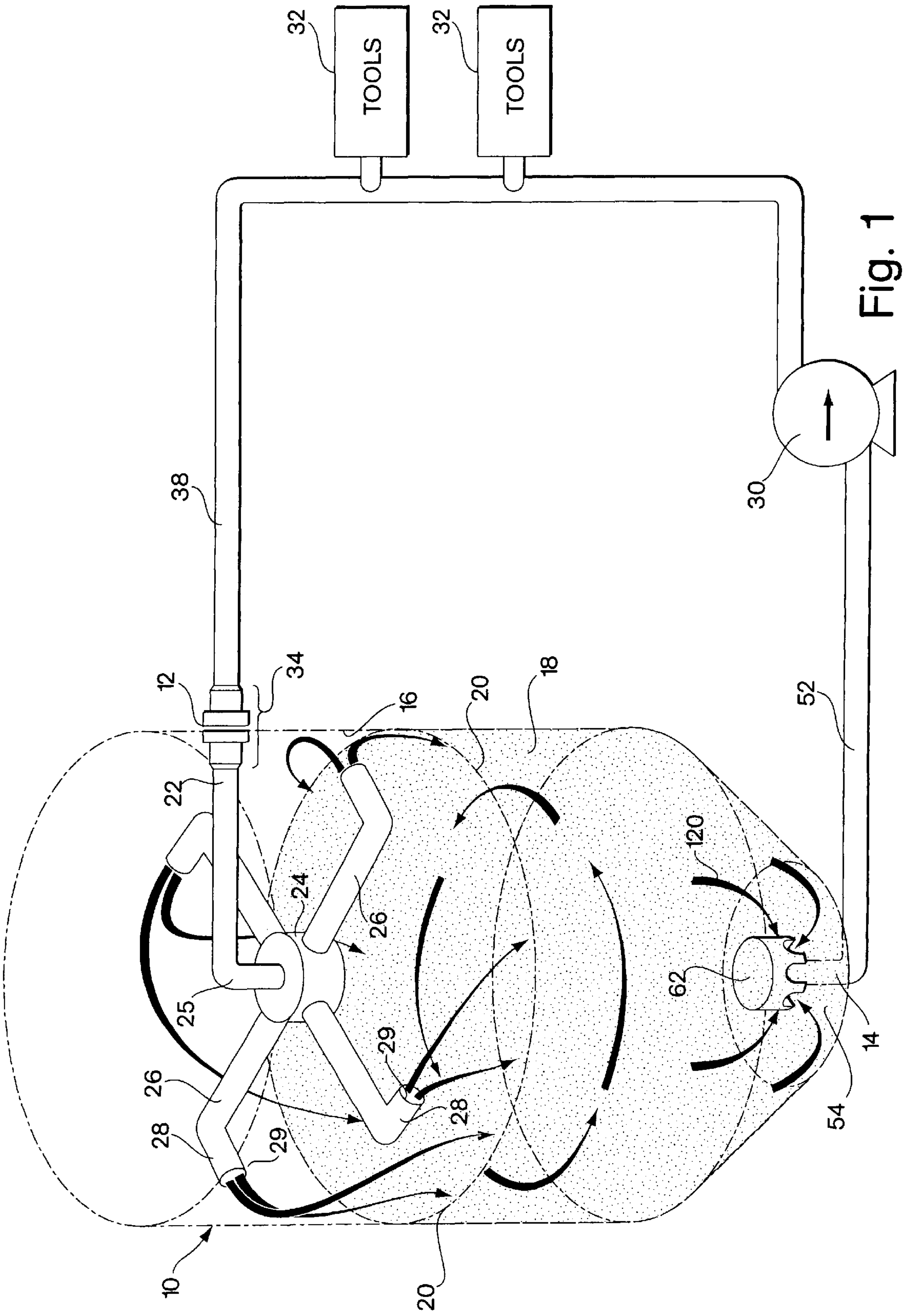
FIG. 1 is an isometric view of an embodiment showing, in combination, a multiple jet mixer and the whirlpool reduction cap of the present invention.

The present invention is directed to a whirlpool reduction cap comprising a top solid surface, a base, a side wall and an inlet positioned in the side wall. The whirlpool reduction cap is positioned over an exit port in a mixing or holding vessel in order to redirect fluid flow as the fluid is withdrawn from the vessel. As used herein, the term "fluid" includes liquids, liquid/liquid mixtures, chemical compositions, liquid/solid mixtures, colloidal suspensions and slurries, and similar solutions. When a fluid is drained from a vessel, a vortex typically forms in the fluid above and along the center line of the exit port. As the fluid level decreases, the vortex tends to draw air into the exit port which may result in oxidation of certain chemical mixtures thereby changing the chemical reactivity of the fluid. In particular, air entrapped in colloidal suspensions used in the CMP of semiconductor wafers reduces the efficiency of the suspension when delivered to CMP tools. The whirlpool reduction cap creates multiple vortices that tend to cancel each other out and may reduce or eliminate a typical vortex. By redirecting fluid flow, the whirlpool reduction cap may also reduce the amount of solid buildup or caking that may deposit along the walls of the vessel as may occur while draining colloidal suspensions. The whirlpool reduction cap may, therefore, assist in delivering homogeneous colloidal suspensions, as well as other fluids, to their destination.

The whirlpool reduction cap may be used with any holding or mixing vessel including intrusive and non-intrusive mixing vessels. The vessel may have any conventional cross-sectional shape including, but not limited to circular, square or rectangular. Similarly, the vessel base may have any shape such as, for example, flat or conical. Further, the whirlpool reduction cap may also be used in conjunction with a filter or other device positioned within or near the vessel.

The whirlpool reduction cap may be comprised of any suitable known material such as, for example, polymers, steel, metal, and the like. The material is preferably compatible with both the vessel and the fluid. The whirlpool reduction cap has a top solid surface with an area that is preferably greater than or equal to the open area of the exit port. As used herein, the term "solid" is defined as having little or no openings in order to redirect a majority of fluid flow away from the center line of the exit port. The top solid surface may be of any shape such as, for example, square, hemispherical, or pyramidal.

The whirlpool reduction cap may comprise one or more side walls of any shape including, for example, irregular or perpendicular to the top surface and/or the vessel base. The side wall is positioned between the top solid surface and the cap base and may extend to any height above the vessel base and is preferably perpendicular to the horizontal plane of the exit port. Preferably, the side wall has sufficient height to accommodate an inlet that allows fluid to flow through the exit port without a significant reduction in fluid volume throughput. As used herein, the phrase "significant reduction" means the volume of flow through the exit port is not restricted by more than about 5%.

The inlet in the side wall may comprise one or more orifices and are preferably sized to allow maximum fluid flow through the exit port. The one or more orifices extend from the side wall towards the center of the cap and exit through the base of the cap. The one or more orifices may interconnect within the cap. They may be of any shape and may be located close to or adjacent the cap base to prevent fluid stagnation and solid build-up at the vessel base. Alternatively, the one or more orifices may be positioned and arranged on the side wall so that they are located close to or adjacent the vessel base when installed in the vessel. The vertical plane of the one or more orifices preferably are positioned perpendicular to a horizontal plane of the exit port. The one or more orifices are preferably positioned and arranged to provide balanced flow about the perimeter of the whirlpool reduction cap.

The cap base connects to the exit port of the vessel by any known conventional means. For example, the cap base may comprise a flange for securing the cap to the vessel base by a variety of means including, for example, screws, adhesives and welding. The whirlpool reduction cap may further comprise a chute extending from the base for insertion into the exit port. The chute may be constructed and arranged to press fit into a non-threaded exit port or may comprise a threaded outer surface to mate with a reverse threaded surface in the exit port. Alternatively, the side wall may extend into the exit port.

FIG. 1 represents an embodiment of the present invention. Whirlpool reduction cap 62 is positioned in a vessel 10 above an exit port or drain 14 and assists in controlling the direction of fluid velocity at the exit port 14. The whirlpool reduction cap aids both in (1) assisting in providing a uniform velocity component, parallel to base 54 of the holding vessel 10 to reduce the amount of solid buildup or caking along the walls of holding vessel 10 and (2) altering the "Coriolis Effect" or formation of a whirlpool or vortex which may form when fluid is drained from holding vessel 10 at base 54.

To achieve a more uniform distribution of fluid at base 54 of holding vessel 10, whirlpool reduction cap 62 draws fluid in a parallel orientation to base 54 of holding vessel 10 as shown with streamlines 120. Whirlpool reduction cap 62, as illustrated in FIG. 1, functions to aid in continual cycling of fluid in the region near the base 54 or exit port 14 of holding vessel 10.

Holding vessel 10 is depicted in FIG. 1 as a cylindrical vessel. However, the shape of the holding vessel is not critical in the present invention, and other shaped holding vessels may also be employed. Additionally, although the base of holding vessel 10 is depicted in FIG. 1 in a conical form, the form of the base is not critical, and other forms, including, but not limited to, hemispherical and truncated forms, may also be used.

The placement of whirlpool reduction cap 62 is illustrated in FIG. 1. Whirlpool reduction cap 62 is affixed at base 54 of the holding vessel 10 above the exit port 14. In its second role, the whirlpool reduction cap serves to decrease vortex formation in the fluid body. As fluid or slurry is demanded by a process tool 32 fluid level 20 will decrease. As fluid is continually cycled, the fluid is orientated in a downward direction and velocity toward exit port 14. This creates what is known as a "Coriolis Effect" in the moving fluid body which is seen as a vortex or whirlpool about a centerline of the drain. A vortex forming in lower fluid levels tends to draw air into supply line 38 as the result of suction created by pump 30. Any air drawn into outlet line 52 will decrease the overall performance of the fluid delivery system and interfere with inline instrumentation monitoring the performance of the system. If, however, the direction of the fluid velocity at the drain point is altered, the "Coriolis Effect" is changed. The overall velocity direction being perpendicular to the above orientation of the fluid velocity creates multiple vortices, which tend to cancel each other out.

Figure 2:
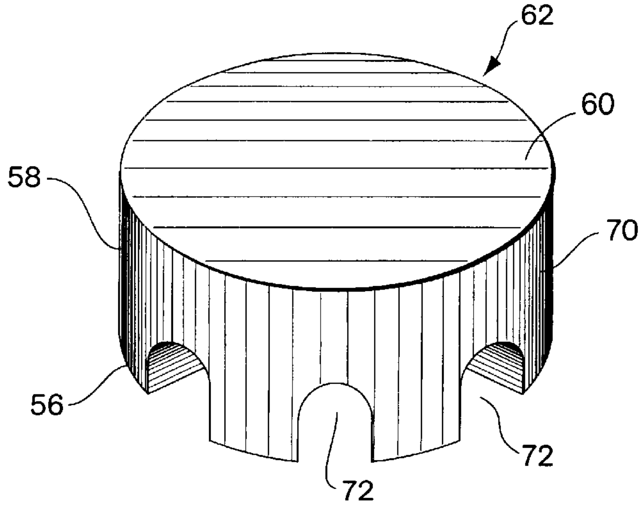
FIG. 2 illustrates a top front perspective view of a whirlpool reduction cap of the present invention.
Figure 3:
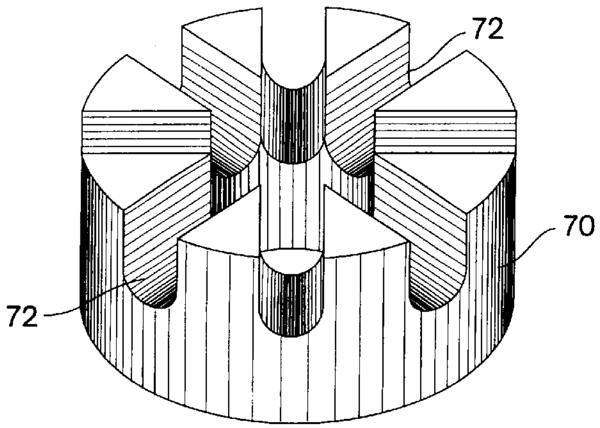
FIG. 3 illustrates a bottom front perspective view of a whirlpool reduction cap as shown in FIG. 2.

As shown in FIGS. 2 and 3, whirlpool reduction cap 62 may comprise a formed body 70 ideally made of material that is homogeneous with other components of the mixing apparatus. The whirlpool reduction cap 62 may be affixed at base 54 of holding vessel 10 by conventional means such as, for example, welding, clamping, screwing, and chemical bonding.

Whirlpool reduction cap 62 includes top solid surface 60, side wall 58 and base 56. Top solid surface 60 may be any shape, such as, for example, flat, convex, triangular or pyramidal. It is preferable that the surface area of top solid surface 60 be equal to or greater than the open area of exit port 14. Side wall 58 is positioned between top surface 60 and base 56 and preferably has sufficient height to accommodate an inlet that allows fluid to flow through exit 14 without a significant reduction in fluid volume throughput.

Figure 4:
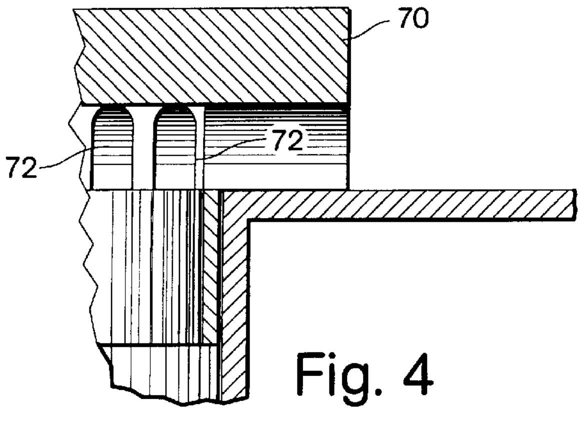
FIG. 4 illustrates a cross-sectional side view of the whirlpool reduction cap as shown in FIG. 2.

The inlet may comprise one or more orifices 72 in side wall 58 and/or base 56. Although not necessary, side wall 58 may be perpendicular to vessel base 56 so that the one or more orifices 72 have center planes perpendicular to a center plane of exit port 14. The one or more orifices 86 extend through side wall 58 to channel fluid through body 70 and into exit port 14 at base 54 of holding vessel 10 as depicted in the cross sectional view shown in FIG. 4. In one embodiment it is preferred that the inlet allows maximum flow of fluid through exit port 14. In this embodiment, the sum of the area of one or more orifices is greater than or equal to the open area of exit port 14. It is also preferred that the one or more orifice is sized and positioned to result in substantially equal flow about the side wall perimeter of the whirlpool reduction cap.

Figure 5:
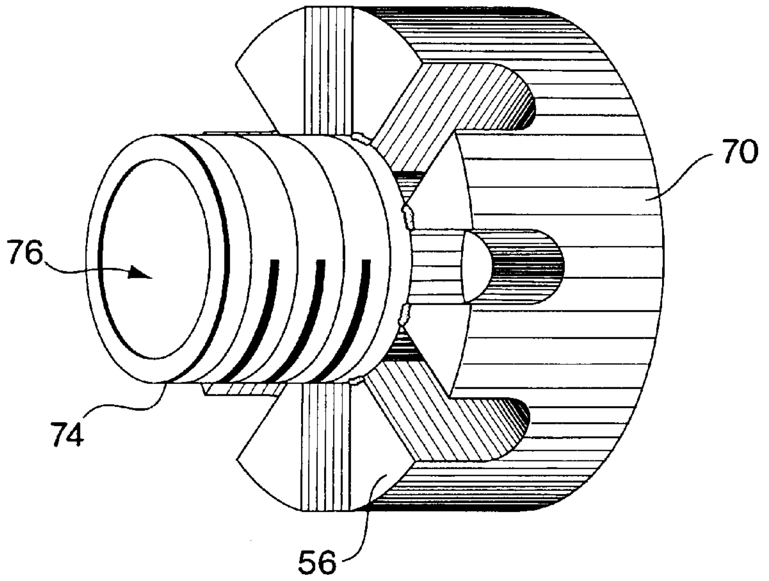
FIG. 5 illustrates a side bottom perspective view of another embodiment of the whirlpool reduction cap of the present invention.
Figure 6:
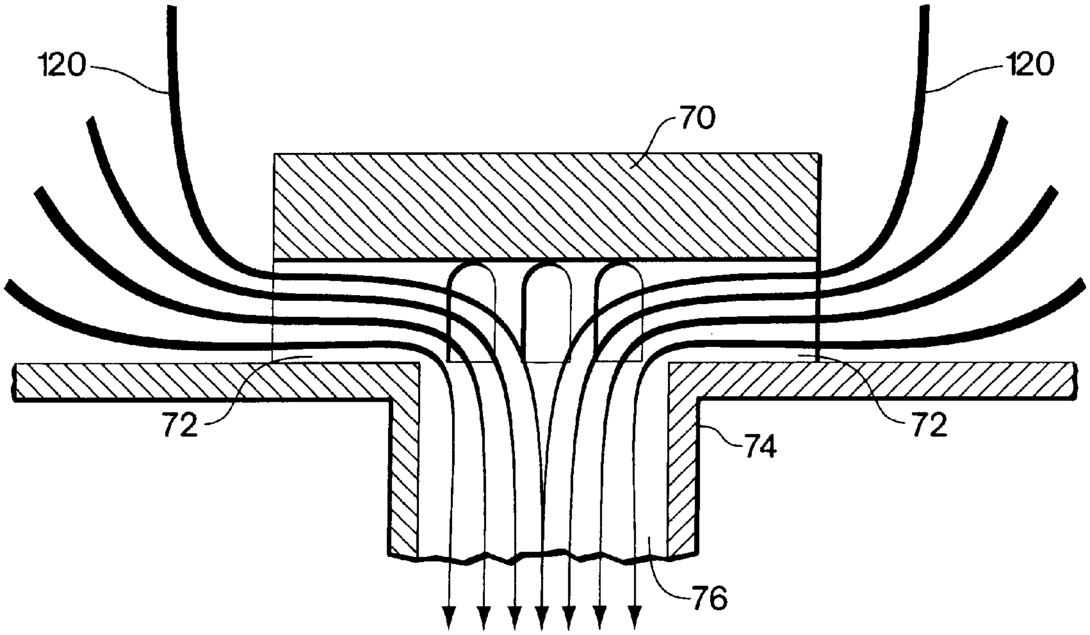
FIG. 6 illustrates a cross-sectional side view of the whirlpool reduction cap shown in FIG. 5 installed in a vessel.

In another embodiment, as illustrated in FIGS. 5 and 6, whirlpool reduction cap 62 may also include chute 74 having a channel 76 extending from base 56 of the formed body. Chute 74 may be used to secure whirlpool reduction cap 62 in exit 14 at the base of holding vessel 10. Chute 74 may be threaded for screwing the whirlpool reduction cap into a threaded drain of holding vessel 10. Alternatively, chute 74 may be tapered or smooth and may be pressed fit into a non-threaded drain of the holding vessel. Fluid streamlines 120 are redirected to a plane perpendicular to the direction of flow through exit port 14.

Figure 7:
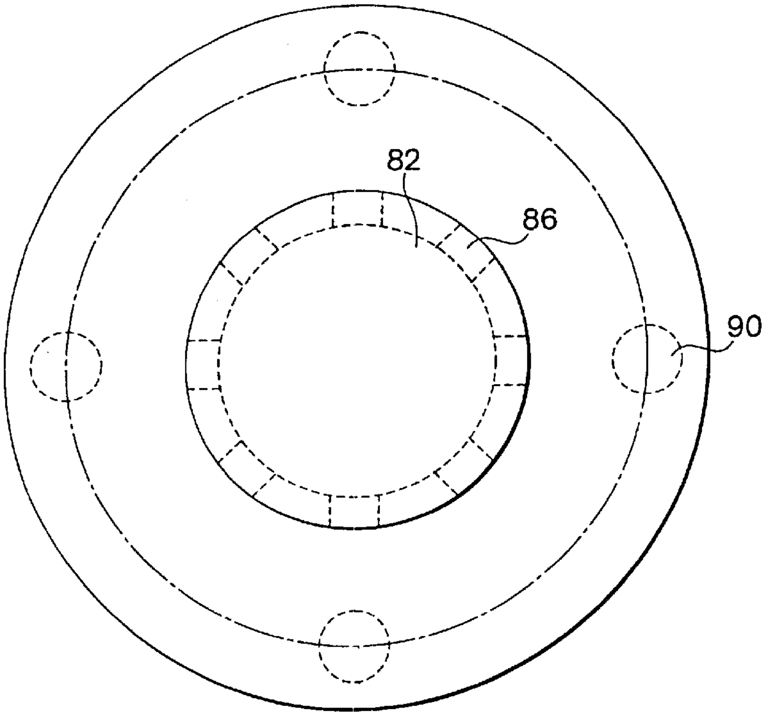
FIG. 7 illustrates a top plan view of another embodiment of a whirlpool reduction cap, with a bottom view shown in dashed lines.
Figure 8:
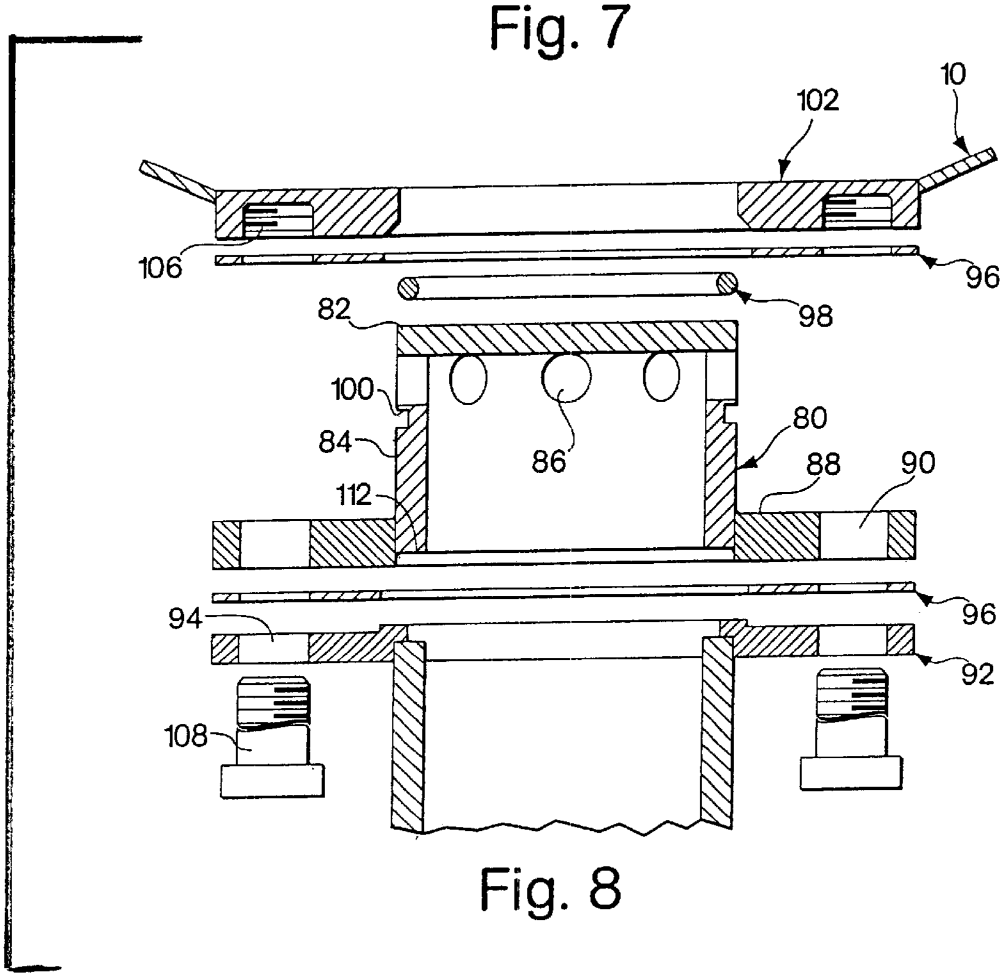
FIG. 8 illustrates an exploded side view of the whirlpool reduction cap shown in FIG. 7 installed in a vessel.

In another embodiment, as illustrated in FIGS. 7 and 8, whirlpool reduction cap comprises removable cap 80.

Removable cap 80 has top solid surface 82, side wall 84, and base 112. One or more orifices 86, sized to allow the fluid to flow through the one or more orifices with out significant reduction in flow through exit port 14, are positioned on side wall 84. Flange 88 has threaded holes 90 for affixing the removable cap 80 to process piping 92 that also comprises threaded holes 94. Removable cap 80 is positioned in gasket 96 that is positioned adjacent vessel insert 102. Vessel insert 102 comprises threaded holes 106 that receive screws 108, and aperture 104 sized to receive removable cap 80. A seal, such as for example an O-ring 98, is positioned in groove 100 to provide a fluid type seal between the cap 80 and the vessel insert 102. Screws 108 removably affix process piping 92, gaskets 96, removable cap 80, to vessel insert 102. When installed, orifices 86 may be positioned close to or adjacent to top surface 110 of vessel insert 102 to reduce or prevent particle sedimentation.

The whirlpool reduction cap 80 may be installed from beneath holding vessel 10. One such method includes installing insert 102 including an aperture into the vessel and inserting a removable whirlpool reduction cap into the aperture. Alternatively, the insert may be formed as an integral structure of the vessel. A process pipe 92 may then be secured to the whirlpool reduction cap and the insert. Gaskets 98 may be positioned between the whirlpool reduction cap and the insert as well as between the whirlpool reduction cap and the process pipe. Although this embodiment comprises a flange affixed by screws, one of ordinary skill would recognize other means for attaching the whirlpool reduction cap such as, for example, an interlock, a quick connect, and press-fit and various modifications in method and structure would be apparent to one skilled in the art.

The whirlpool reduction cap may be used in conjunction with any fluid vessel such as, for example, vessel containing intrusive and non-intrusive mixers. One such vessel is described in U.S. Pat. No. 6,109,778, and is incorporated herein by reference. As illustrated in FIG. 1, fluid is introduced trough delivery line, 22, and travels through elbow 25 (shown here as a 90° elbow) to mixing junction 24, and is branched off to each jet 28 through tubing 26.

Fluid exits jet outlet 29 tangent to an inner surface of the holding vessel 10. Exiting the jet outlets 29, the fluid cascades down an internal peripheral wall of holding vessel 10. Surface adhesion between the fluid and peripheral walls 16 of holding vessel 10 hold the cascading fluid to a peripheral wall 16 until it collides with the fluid body already in holding vessel 10 at fluid level 20. As fluid cascades down peripheral walls 16 under gravity, the thickness of the fluid stream is reduced to a thin sheet until it collides with the fluid body in the holding vessel and impedes momentum to begin rotating the entire fluid body in holding vessel 10 in a helical pattern toward the base 54 of holding vessel 10 as illustrated in FIG. 1. The collision of the thin fluid sheet with the overall fluid body reduces folding and splashing and also creates a helical flow which causes homogeneous mixing throughout the vessel.

An outlet connection 14 at base 54 of holding vessel 10 leads to supply line 38 and to a circulating pump 30, through which fluid is either circulated to tools 32 that will use the fluid, for example in CMP applications where the fluid is a colloidal suspension such as slurry, or recirculated back into holding vessel 10 through supply line 38 to main delivery line 22 and back through the multiple jet mixing assembly where the mixing process beings anew.

The streamlines 120 created from the varied orientation are situated parallel to the base 54 of holding vessel 10. These streamlines tend to channel fluid towards the exit port which help to provide a lower solid content at the base than without any device. The whirlpool reduction cap 62 reduces the effect of air entrapment by altering the direction of the fluid being drawn into the system through the exit port. This reduction of whirlpool formation helps to assist in the amount of usable slurry volume inside the holding vessel. Also, because the direction of the outgoing slurry is parallel with the base of the holding vessel, a better state of agitation towards the bottom of holding vessel 10 is developed. Slurry at the base holding vessel 10 is drawn into the exit port while upper layers replenish this void resulting in is less likelihood of settling over time through the continuous cycling process.

EXAMPLES

The following examples illustrate embodiments of the invention. This invention is not limited by the examples set forth below. Obviously, numerous modifications and variations of the present invention are possible in light of the above teachings.

Example I

Four Jet Mixer Without Fluid Diverters and Whirlpool Reduction Cap

A holding vessel was prepared without a whirlpool reduction cap. A fluid was recirculated through four jets tangent to the inner surface of the holding vessel. The fluid cascaded down the inner surface of the vessel, impinged the fluid surface and imparted a helical motion to the fluid body. The fluid surface was observed for homogeneity during recirculation. Upon draining the fluid, the vessel was inspected for settling and caking.

a. Materials Used

MEGAflow™ 111B Fixture w/Global Loop Simulator

Four Jet Mixer, Prototype Unit

Atomizer Fixture

Slurry, RODEL QCTT-1011

Sampling Apparatus b. Procedure

A four jet mixing assembly was fashioned out of existing parts on hand. A ¾" female thread tapped at the center of the cross, perpendicular to the orientations of the openings. Each of the four openings was reduced to accept ⅜ Flaretek-½"NPT PFA fittings by gluing the appropriate reducers. Approximately 5.1" of flared ⅜" PFA tubing was connected to each of the PFA fittings. Each of the PFA tubes were connected to ⅜" 90° elbows. The entire assembly (in the form of a cross) was mounted so that the center of the cross was colinear to the centerline of the holding vessel. The orientation of the outlets of the elbows (jets) were situated so that the outgoing stream of fluid was tangent to the inner surface of the holding vessel and coplanar to the fluid level. The total area of outgoing fluid was 1.56 times smaller than the standard area of the ¾" PFA tubing. The orientation of overall fluid rotation was in a counter-clockwise motion.

The plane created by the centerlines of the four individual jets of the mixer body sat 4" lower than the centerline of the PFA bulkhead at the top of the holding vessel. This reduced the overall initial volume of the slurry body from 23 gallons to 19 gallons.

A global loop ran for 18 hours at 30 psi. In order to speed up overall vessel drainage and reduce any error to the data from settling during a static draining of the holding vessel, the vessel was segmented in 2" intervals to represent the distribution according to fluid level. The pump was shut off and all valves leading to the system were closed. The holding vessel was drained under static conditions during sample gathering. Two samples of slurry were gathered at each fluid level. A total of 14 pairs of data were collected. The overall time of draining during sample acquisition was about 15 min.

Observations of the fluid surface prior to draining revealed a thin layer of settled material at the center of the fluid surface. The diameter of the settled region was about 4[000b]5 in. and its maximum depth was estimated to be around 0.4 cm. This was attributed to the helical motion of the fluid in the vessel. The velocity of the fluid appeared somewhat slower at the center than at the edges, where fluid from the jets stirs the fluid body.

The vessel was inspected upon completion of draining the slurry to observe any signs of caking on the interior wall or sludge deposits at the base of the vessel. Caking thickness on the interior peripheral wall varied. Where the fluid flow path struck the inner surface and fell downward under gravitational influence there were no signs of caking. The region where caking developed varied from 0.5 to 1.0 mm in thickness. The volume of resulting caking was calculated to be 100 mL. The base of the vessel showed slight signs of sludge buildup. The resulting volume was calculated to be 200 mL.

Example II

Four Jet Mixer with Fluid Diverters and Whirlpool Reduction Cap

The holding vessel of Example I was fitted with a whirlpool reduction cap and flow diverters. Again, the fluid surface was observed for homogeneity during recirculation and upon draining, the vessel was inspected for settling and caking.

a. Materials Used

MEGAflow™ 111b Fixture w/Global Loop Simulator
Four Jet Mixer, Prototype Unit
Whirlpool Reduction Cap, Prototype Unit
PLC Data Fixture
Atomizer Fixture
Slurry, RODEL QCTT-1011
Sampling Apparatus b. Procedure A whirlpool reduction cap was fashioned from a 2" PVC end cap. The lateral side of the cap had four slots approximately ½" wide and ⅝" high cut in four equal places.

From previous observations, the center of the fluid body located at the fluid level showed some settling. To increase center homogeneity, two flow diverters were built from ½" thick natural polypropylene sheets. The diverters were 1.5"× 21". Two sets of ½" holes were drilled at ⅝" apart and each set has 14 holes 1.5" apart.

A Flouroware T-fitting was connected between the inner wall of the holding vessel and the four jet mixer. The T-fitting was reduced to ⅜" diameter tubing and a Parker PTFE needle valve was mounted at the end. During system operation at 40 psi, the needle valve was allowed to bleed off material at approximately 30 ml/min. This flow represented the demand of the slurry to a tool. It was used for sampling the fluid drawn from the base of the holding vessel during the empirical analysis.

The addition of the whirlpool reduction cap and the flow diverters to the four jet assembly assisted in an improved homogeneity of the colloidal suspension by reducing the overall statistical deviation from±0.11% down to±0.09% non volatile solids. The post drain state of the holding vessel revealed 0.15 L total settled solids. Final improvements over the course of the test showed an order of magnitude (10×) reduction of settled solids which was complemented by the statistical reduction in the overall sampling four-fold.

Example III

Whirlpool Reduction Cap

Initial use and testing of the whirlpool reduction cap were tried during a single jet test with deionized water in order to quell whirlpool formation. During the test of the four jet assembly, when the system was refitted with the diverters and the whirlpool reduction cap, an overall improvement was observed both in the empirical and visual data gathered.

Overall improvements were observed during post test inspection of the drained holding vessel when the whirlpool reduction cap was affixed to the drain. The overall direction of the drainage was changed from a true vertical direction to a nearly planar orientation to the base of the vessel. Fluid drawn into the drain by the pump interacts more with the surface of the holding vessel and thereby inducing agitation in this region. At regions on the surface of the vessel near the outlet, a significant reduction of sludge was observed.

What is claimed is:

1. A whirlpool reduction cap positioned in a vessel above an exit port centrally located in a base of the vessel, comprising:

a top solid surface greater than or equal to the area of the centrally located exit port in the vessel;

a base connected to the exit port;

a side wall positioned between the top surface and the base;

an inlet positioned in the side wall.

2. The whirlpool reduction cap of claim 1, wherein the side wall extends into the vessel.

3. The whirlpool reduction cap of claim 1, wherein the base further includes a means for securing the base to the exit port.

4. The whirlpool reduction cap of claim 1, wherein the inlet comprises one or more orifices on the side wall.

5. The whirlpool reduction cap of claim 4, wherein the sum of the areas of the one or more orifices is equal to or greater than the area of the exit port.

6. The whirlpool reduction cap of claim 1, further comprising at least one orifice in the base.

7. The whirlpool reduction cap of claim 6, wherein the sum of the areas of the one or more orifices in the side wall and in the base is equal to or greater then the area of the exit port.

8. The whirlpool reduction cap of claim 1, further comprising a filter.

9. The whirlpool reduction cap of claim 1, wherein the side wall is perpendicular to the vessel base.

10. The whirlpool reduction cap of claim 9, wherein the one or more inlets has a center plane perpendicular to a center plane of the fluid exit port in the vessel.

11. The whirlpool reduction cap of claim 1, wherein the one or more inlets are sized to permit maximum fluid flow through the exit port.

12. The whirlpool reduction cap of claim 1, wherein the one or more inlets are positioned to permit balanced flow of fluid through the side wall.

13. The whirlpool reduction cap of claim 3, wherein the means for securing the base to the exit port comprises a flange.

14. The whirlpool reduction cap of claim 3, wherein the means for securing the base to the exit port comprises a chute.

15. The whirlpool reduction cap of claim 3, wherein the means for securing the base to the exit port is removable.

16. The whirlpool reduction cap of claim 1, wherein the cap is constructed and arranged for insertion into the exit port of the vessel such that the base is secured to the vessel and a process pipe.

17. The whirlpool reduction cap of claim 16, wherein the base further includes a flange.

18. The whirlpool reduction cap of claim 16, wherein the cap further comprises a seal.

19. The whirlpool reduction cap of claim 1, wherein the inlet is positioned adjacent only the vessel base.

20. The whirlpool reduction cap of claim 1, wherein the cap is a formed body.

21. The whirlpool reduction cap of claim 20, wherein the cap is constructed and arranged for insertion into the exit port of the vessel such that the base is secured to the exterior surface of the vessel and a process pipe.

22. The whirlpool reduction cap of claim 21, wherein the sum of the areas of the one or more orifices is equal to or greater than the area of the exit port.

23. The whirlpool reduction of claim 22, wherein the one or more inlets has a center plane perpendicular to a center plane of the fluid exit port in the vessel.

24. The whirlpool reduction cap of claim 20, wherein the base further includes a means for securing the base to the exterior surface of the vessel.

25. The whirlpool reduction cap of claim 20, wherein the inlet comprises one or more orifices on the side wall.

26. The whirlpool reduction cap of claim 20, further comprising a filter.

27. The whirlpool reduction cap of claim 20, wherein the side wall is perpendicular to the vessel base.

28. The whirlpool reduction cap of claim 20, wherein the one or more inlets are sized to permit maximum fluid flow through the exit port.

29. The whirlpool reduction cap of claim 20, wherein the one or more inlets are positioned to permit balanced flow of fluid through the side wall.

30. The whirlpool reduction cap of claim 1, wherein the vessel is a holding vessel for providing a homogeneous slurry.

31. The whirlpool reduction cap of claim 30, wherein the base further includes a flange.

32. The whirlpool reduction cap of claim 30, wherein the cap further comprises a seal.

33. The whirlpool reduction cap of claim 30, wherein the cap is removably secured to both the exterior surface of the vessel and the process pipe.

34. A whirlpool reduction cap positioned in a vessel above an exit port, comprising:

a top solid surface greater than or equal to the area of the exit port in the vessel;

a base connected to an exterior surface of the vessel;

a side wall positioned between the top surface and the base; and an inlet positioned in the side wall; and an outlet positioned below the exit port of the vessel.

35. The whirlpool reduction cap of claim 34, wherein the means for securing the base to the exterior surface of the vessel comprises a flange.

36. The whirlpool reduction cap of claim 34, wherein the means for securing the base to the exterior surface of the vessel is removable.

* * * * *